United States Patent
Wierich

(10) Patent No.: US 9,883,080 B2
(45) Date of Patent: *Jan. 30, 2018

(54) VEHICLE VISION SYSTEM WITH COLOR CORRECTION

(71) Applicant: MAGNA ELECTRONICS INC., Auburn Hills, MI (US)

(72) Inventor: Thomas Wierich, Butzbach (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/463,297

(22) Filed: Mar. 20, 2017

(65) Prior Publication Data

US 2017/0195525 A1    Jul. 6, 2017

Related U.S. Application Data

(63) Continuation of application No. 14/356,330, filed as application No. PCT/US2012/063520 on Nov. 5, 2012, now Pat. No. 9,604,581.

(Continued)

(51) Int. Cl.
*H04N 1/60* (2006.01)
*B60R 1/00* (2006.01)
(Continued)

(52) U.S. Cl.
CPC ............. *H04N 1/6027* (2013.01); *B60R 1/00* (2013.01); *H04N 9/07* (2013.01); *H04N 9/735* (2013.01);
(Continued)

(58) Field of Classification Search
CPC ........... G06T 7/408; G06T 2207/10024; G06T 2207/30252; H04N 9/735
(Continued)

(56) References Cited

U.S. PATENT DOCUMENTS 5,426,294 A   6/1995   Kobayashi et al.
5,532,848 A   7/1996   Beretta
(Continued)

FOREIGN PATENT DOCUMENTS

WO    WO2007103573    9/2007

OTHER PUBLICATIONS

International Search Report and Written Opinion dated Jan. 17, 2013 for corresponding PCT Application No. PCT/US2012/063520.
(Continued)

*Primary Examiner* — Nguyen Truong

(74) *Attorney, Agent, or Firm* — Gardner, Linn, Burkhart & Flory, LLP

(57) ABSTRACT

A method for processing color image data captured by a vehicular camera includes providing a color camera having an imaging array having a plurality of photosensors, and disposing one or more spectral filters at or in front of photosensors of the plurality of photosensors of the imaging array. The color camera is disposed at a vehicle so as to have a field of view exterior of the vehicle. The color camera captures image data that is provided to an image processor, which processes the image data captured by the color camera. The processing of image data includes processing via an algorithmic loop that corrects color variation due to lighting conditions so that images derived from captured image data are color corrected. The algorithmic loop includes processing image data in a color correction loop for color correction.

21 Claims, 15 Drawing Sheets

Related U.S. Application Data

(60) Provisional application No. 61/556,556, filed on Nov. 7, 2011.

(51) Int. Cl.
*H04N 9/07* (2006.01)
*H04N 9/73* (2006.01)

(52) U.S. Cl.
CPC ..... *B60R 2300/30* (2013.01); *B60R 2300/802* (2013.01)

(58) Field of Classification Search
USPC .......................................................... 348/148
See application file for complete search history.

(56) References Cited

U.S. PATENT DOCUMENTS

| | | | |
|---|---|---|---|
| 5,535,314 A | 7/1996 | Alves et al. | |
| 5,550,677 A | 8/1996 | Schofield et al. | |
| 5,670,935 A | 9/1997 | Schofield et al. | |
| 5,796,094 A | 8/1998 | Schofield et al. | |
| 5,949,331 A | 9/1999 | Schofield et al. | |
| 6,523,976 B1 | 2/2003 | Turnbull et al. | |
| 7,266,248 B2 | 9/2007 | Matherson et al. | |
| 7,375,803 B1 | 5/2008 | Bamji | |
| 7,664,315 B2 | 2/2010 | Woodfill et al. | |
| 7,855,755 B2 | 12/2010 | Weller et al. | |
| 8,416,316 B2 | 4/2013 | Park et al. | |
| 8,446,470 B2 | 5/2013 | Lu et al. | |
| 9,604,581 B2 | 3/2017 | Wierich et al. | |
| 2006/0028731 A1 | 2/2006 | Schofield et al. | |
| 2006/0153450 A1 | 7/2006 | Woodfill | |
| 2007/0201738 A1 | 8/2007 | Toda et al. | |
| 2009/0207274 A1 | 8/2009 | Park | |
| 2011/0212717 A1 | 9/2011 | Rhoads | |

OTHER PUBLICATIONS

Buluswar, Shashi D. et al., "Color Machine Vision for Autonomous Vehicles Learn Colors on Samples Auto," Engineering Applications of Artificial Intelligence, vol. 11, Issue 2, Apr. 1, 1998, pp. 245-256, http://www.sciencedirect.com/science/article/pii/S0952197697000791.

Judd et al., "Spectral Distribution of Typical Daylight as a Function of Correlated Color Temperature," Aug. 1964.

Young-Chang, Chang, "RGB Calibration for Color Image Analysis in Machine Vision Correcting the Variations in RGB Color Values Caused by Vision System Components," Image Processing, IEEE Transactions on vol. 5, Issue 10, Department of Agriculture Engineering, Illinois University, Oct. 1996, pp. 1414-1422, Abstract. http://ieeexplore.ieee.org/xpl/freeabs_all.jsp?arnumber=536890.

| w(1) | w(2) | w(3) | w(4) | w(5) | w(6) |
|---|---|---|---|---|---|
| w(7) | w(8) | w(9) | w(10) | w(11) | w(12) |
| w(13) | w(14) | w(15) | w(16) | w(17) | w(18) |
| w(19) | w(20) | w(21) | w(22) | w(23) | w(24) |

FIG. 6C

| 0,1 | 0,4 | 0,3 | 0,9 | 0,8 | 0,4 |
|---|---|---|---|---|---|
| 0,2 | 0,6 | 0,6 | 0,9 | 0,7 | 0,8 |
| 0,4 | 0,3 | 0,5 | 0,1 | 0,1 | 0,7 |
| 0,8 | 0,5 | 0,7 | 0,2 | 0,4 | 0,3 |

FIG. 6D

VEHICLE VISION SYSTEM WITH COLOR CORRECTION

CROSS REFERENCE TO RELATED APPLICATIONS

The present application is a continuation of U.S. patent application Ser. No. 14/356,330, filed May 5, 2014, now U.S. Pat. No. 9,604,581, which is a 371 national phase filing of PCT Application No. PCT/US2012/063520, filed Nov. 5, 2012, which claims the filing benefit of U.S. provisional application, Ser. No. 61/556,556, filed Nov. 7, 2011, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, such as rearwardly or sidewardly or forwardly of the vehicle. The camera provides communication/data signals, including camera data or image data that may be displayed for viewing by the driver of the vehicle, and/or that may be processed and may detect objects or vehicles or light sources or the like responsive to such image processing. The image data captured by the color image cameras is processed via an algorithmic loop that corrects color variations due to lighting conditions and the like so that the images displayed or processed represent the substantially true or corrected color of the imaged objects.

These and other objects, advantages, purposes and features of the present invention will become apparent upon review of the following specification in conjunction with the drawings.

BRIEF DESCRIPTION OF THE DRAWINGS

FIG. 6C shows a table of weighting factors of color patch according its position as used in the algorithm of FIG. 5;

FIG. 6D shows a table of exemplary weighting factors of color patches as used in the algorithm of FIG. 5;

DESCRIPTION OF THE PREFERRED EMBODIMENTS

Figure 1:
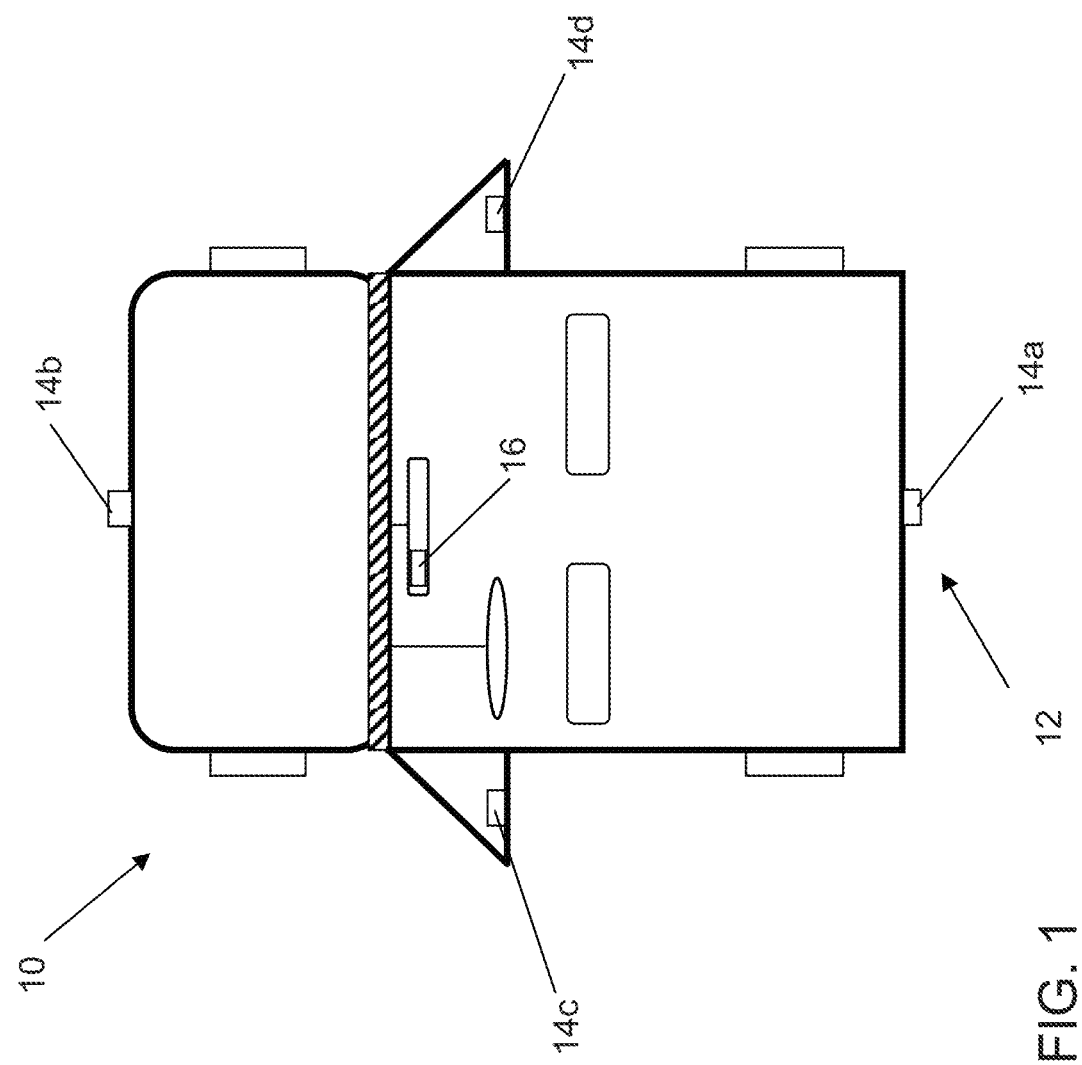
FIG. 1 is a plan view of a vehicle with a vision system and imaging sensor or camera that provides an exterior field of view in accordance with the present invention.

Referring now to the drawings and the illustrative embodiments depicted therein, a vehicle 10 includes an imaging system or vision system 12 that includes at least one imaging sensor or camera (such as a rearward facing imaging sensor or camera 14a and/or optionally such as a forwardly facing camera 14b at the front (or at the windshield) of the vehicle, and/or a rearwardly and/or sidewardly facing camera 14c, 14b at the sides of the vehicle), which captures images exterior of the vehicle, with the camera or camera having a lens for focusing images at or onto an imaging array or imaging plane of the camera (FIG. 1). The vision system 12 is operable to process image data captured by at least one camera (such as, for example, the rearwardly facing camera 14a) to detect objects, such as objects to the rear of the subject or equipped vehicle during a reversing maneuver, or such as approaching or following vehicles or vehicles at a side lane adjacent to the subject or equipped vehicle or the like, and/or the system may display images captured by the camera or cameras (such as at a display screen 16 that is viewable by the driver of the vehicle). The method or system or process of the present invention is operable to process image data and correct color variations so that a display of the captured color images and/or processing of the captured color images uses color data or information that is substantially adapted or corrected to the true or correct color of imaged objects to correct for color variations due to color lighting conditions and the like, as discussed below.

It is known to divide the Planckian Locus (which is a varying of gray on a x-y color room (or known as a CIE or Red-Green-Blue or RGB room or r-g room) emitted from a perfectly black body (with blue-green as x, magenta green as y)) into sections along the locus which are within a tolerance band above and below the locus (but apart from points which represent strong colors), and to use this for calibrating the white balance (such as for a printer), such as described in U.S. Pat. No. 5,532,848, which is hereby incorporated herein by reference in its entirety. It has been proposed that there is a statistical distribution of colors in the daylight spectrum (see, for example, Deane B. Judd et al., 'Spectral Distribution of Typical Daylight as a Function of Correlated Color Temperature,' 1964, which is hereby incorporated by reference in its entirety).

Figure 2:
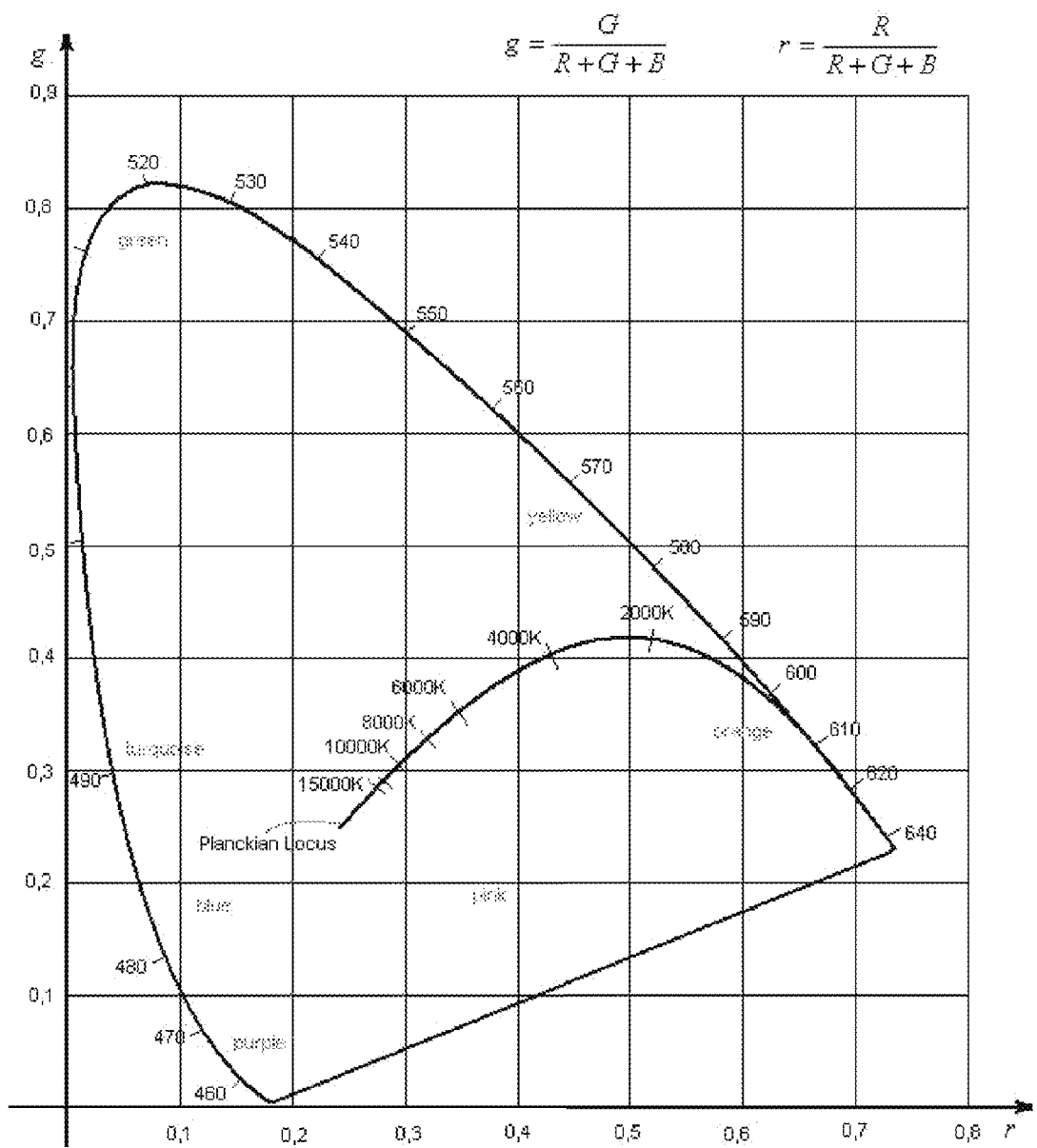
FIG. 2 is a Planckian Locus with within the r-g color room.

The Planckian Locus or black body locus is the path or locus that the color of an incandescent black body would take in a particular chromaticity space as the blackbody temperature changes. The path or locus goes from a deep red color at low temperatures through orange, yellowish white, white, and finally to bluish white colors at very high temperatures. A color space is a three-dimensional space with colors specified by a respective set of three numbers (for example, either the CIE coordinates X, Y, and Z, or other values such as hue, colorfulness, and luminance), which specify the color and brightness of a particular homogeneous visual stimulus. A chromaticity is a color projected into a two-dimensional space that ignores brightness. For example, the standard CIE XYZ color space projects directly to the corresponding chromaticity space specified by the two chromaticity coordinates known as x and y. This is similar to the coordinates on the r (red-blue) axis and g (green-purple) axis in the r-g-room, resulting in a diagram such as shown in FIG. 2. A color opponent room is the perception based L*a*b*-color room according: EN ISO 11664-4 L*a*b* expressing the color reproduction/ perception device independent r-g and XYZ equating colors can be translated from one to another by a*/b* diagrams.

Vehicle vision systems are typically equipped with cameras that are active in the visible spectrum, or other wavelengths, such as near infrared and/or infrared wavelengths. It is a typical difficulty to provide a color camera image to a display screen or processing system, with the color image having colors that closely correspond to the colors in nature (the imaged objects' natural colors), and such as picked up by a human eye. It is often difficult for automotive cameras to distinguish whether an object external of the equipped vehicle appears as a specific color because the object may be illuminated by a colored light source (for example, by the headlights of the equipped vehicle or by headlights of other vehicles or by street lights or by street signage, such as reflections of light incident on street signage or illumination from street signage, and especially so during nighttime driving conditions), or the object may be otherwise discolored or colored by itself. In order to correct the influences of colored illumination and the like, and thus find a white color reference point in the x-y or r-g room, an algorithm may be used that estimates the color temperature (such as of a black body within the x-y or r-g color room). An example of such an algorithm is a Bretford algorithm, which delivers a color temperature B of a scene captured in the color temperature A. The Bretford algorithm delivers a common solution, and occurs typically online, and thus may consume valuable processing power of a camera's or vision system's processor or processors.

Figure 3:
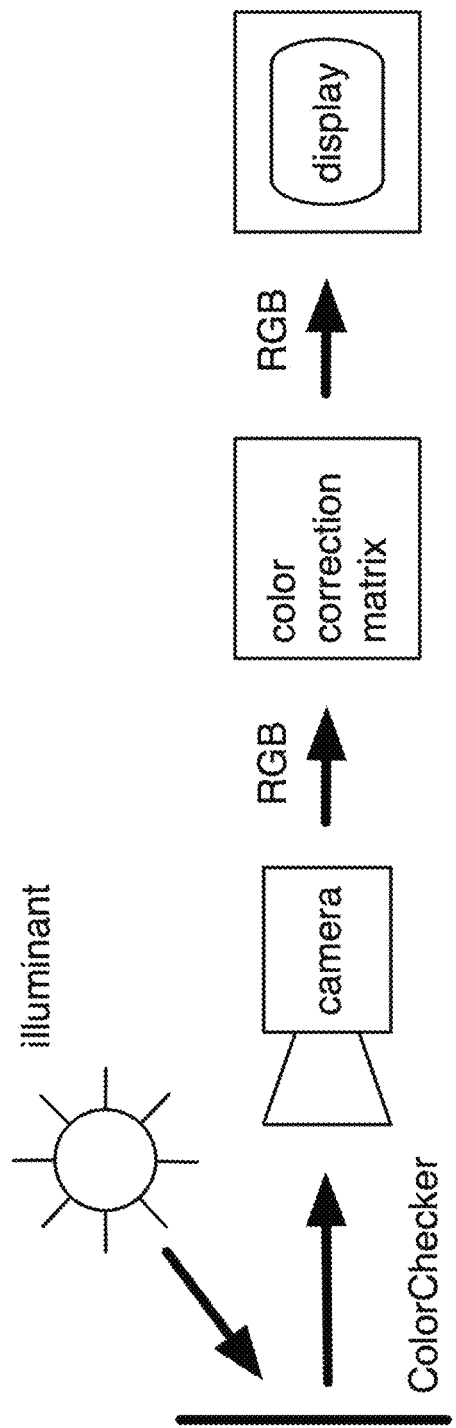
FIG. 3 is a schematic showing a chain of devices contributing to an image reprocessing, where the goal is that the resulting output image represents the scene which was present in front of the camera, and in this case a color checker patch was the source image, illuminated by an illuminant of unknown color.
Figure 4:
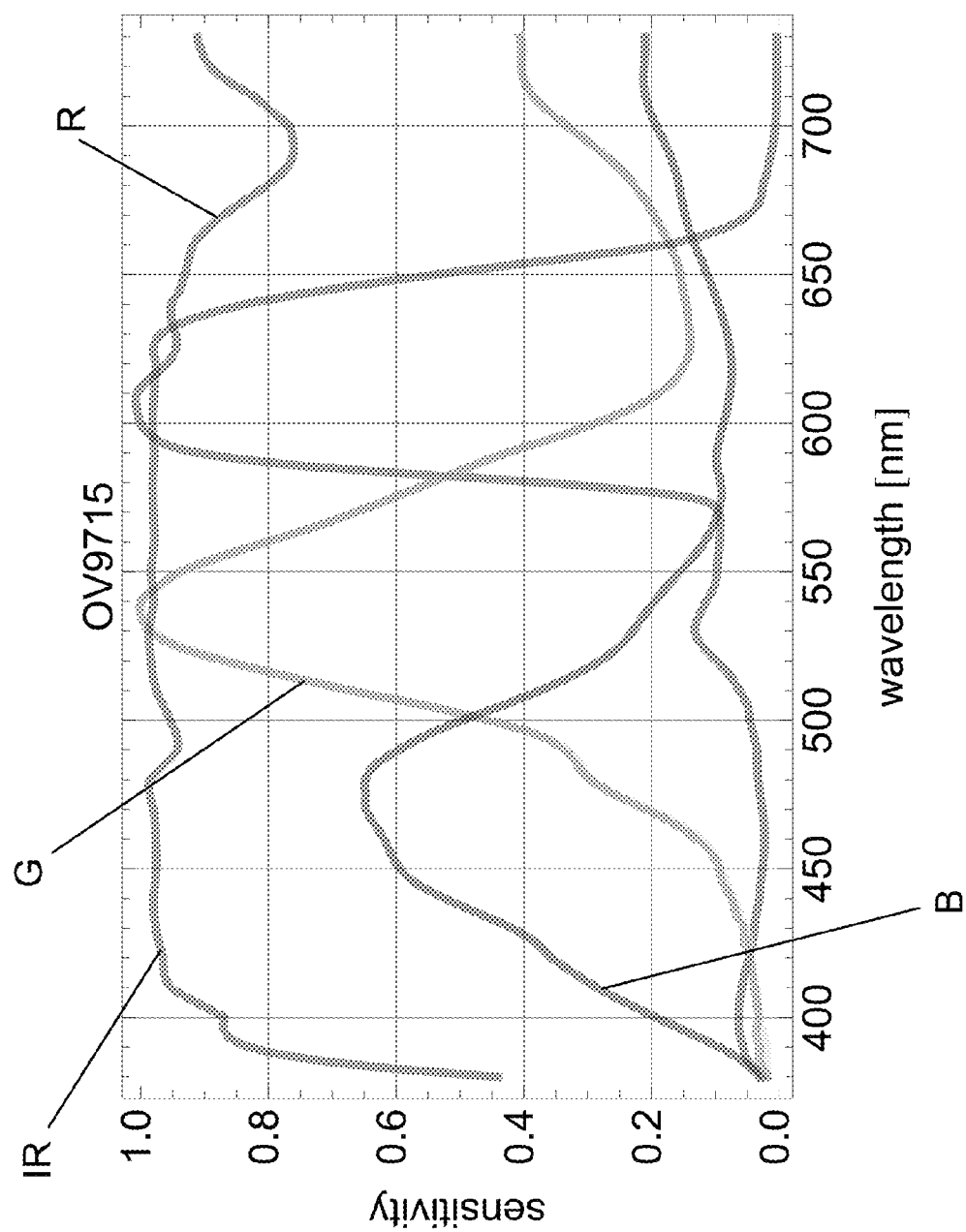
FIG. 4 shows the sensitivity spectrum of a camera plus its typically used infra-red filters (at the IR curve), shown with the sensitivity of the blue (at the B curve) and green (at the G curve) pixels to wavelengths above the visible red (the R curve) being suppressed.

Instead of running such a color temperature estimation/ prediction algorithm online, it is more economical (and uses reduced online computing power) to run particular algorithms offline and to provide pre-processed parameters in look up tables for a color correction matrix (CCM) during run time. A CCM is specific to illuminant, camera, display (see FIG. 3) and the spectrum filters (such as shown in FIG. 4). A 3×3 color correction matrix has been found to be enough to cover most cases (see FIG. 3). There may always be many input color temperatures, but just one output point.

To generate the matrix elements for all points, a numerical optimization algorithm as like a differential evolutional algorithm may be used. As an execution example there may be signed matrix coefficient values. For each illuminant with a specific spectral energy distribution, a sensor and display optimal CCM can be calculated. This process involves numerical non-linear optimization and is computation intensive. Thus, it may not be executed during run time but may be calculated and tabulated for use.

Figure 7:
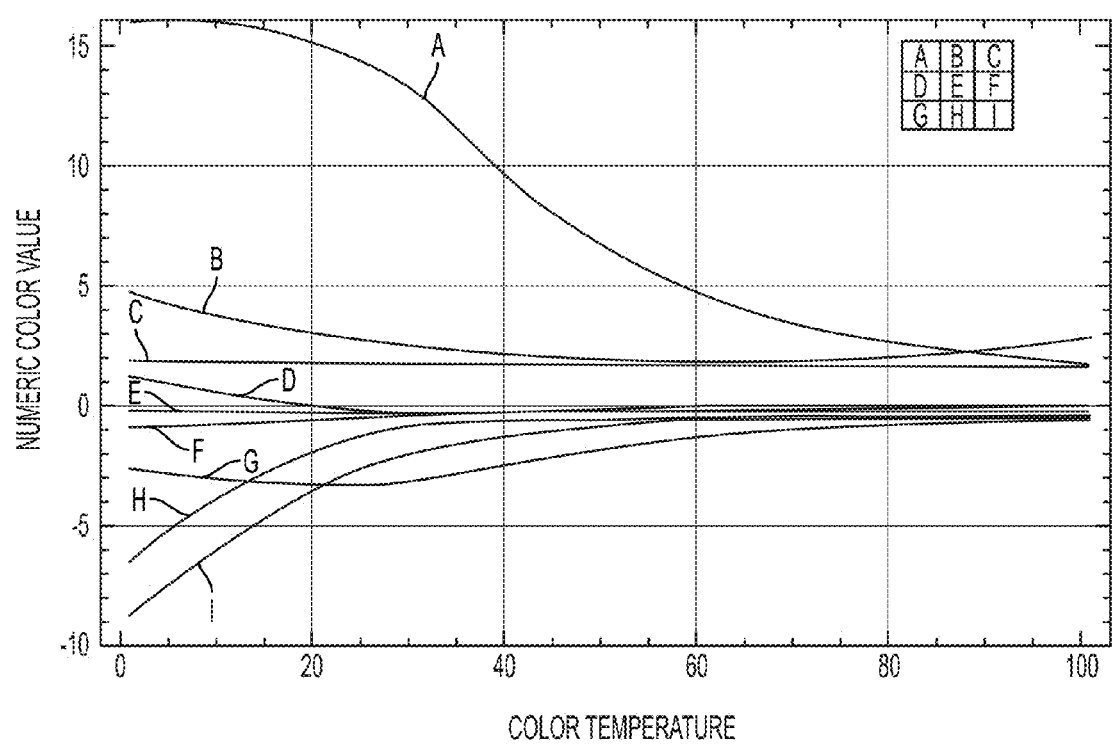
FIG. 7 is a schematic of a 3×3 correction matrix with exemplary curves A to I that are polynomial alignments to the points or dots or data points.

For achieving an advantage compared to linear interpolation between two neighboring coefficient sets a polynomial of any order is fitted along the data or pin points which equate to nine polynomic curves that run through all matrix coefficient points of one matrix position (A to I according to the chart of FIG. 7). If the spectral properties between two illuminants change in a continuous way like they do with illuminants on the Planckian Locus, it is possible to extract any color temperature specific CCM coefficients out of the polynomials for any CCT (Correlated Color Temperature).

Figure 5:
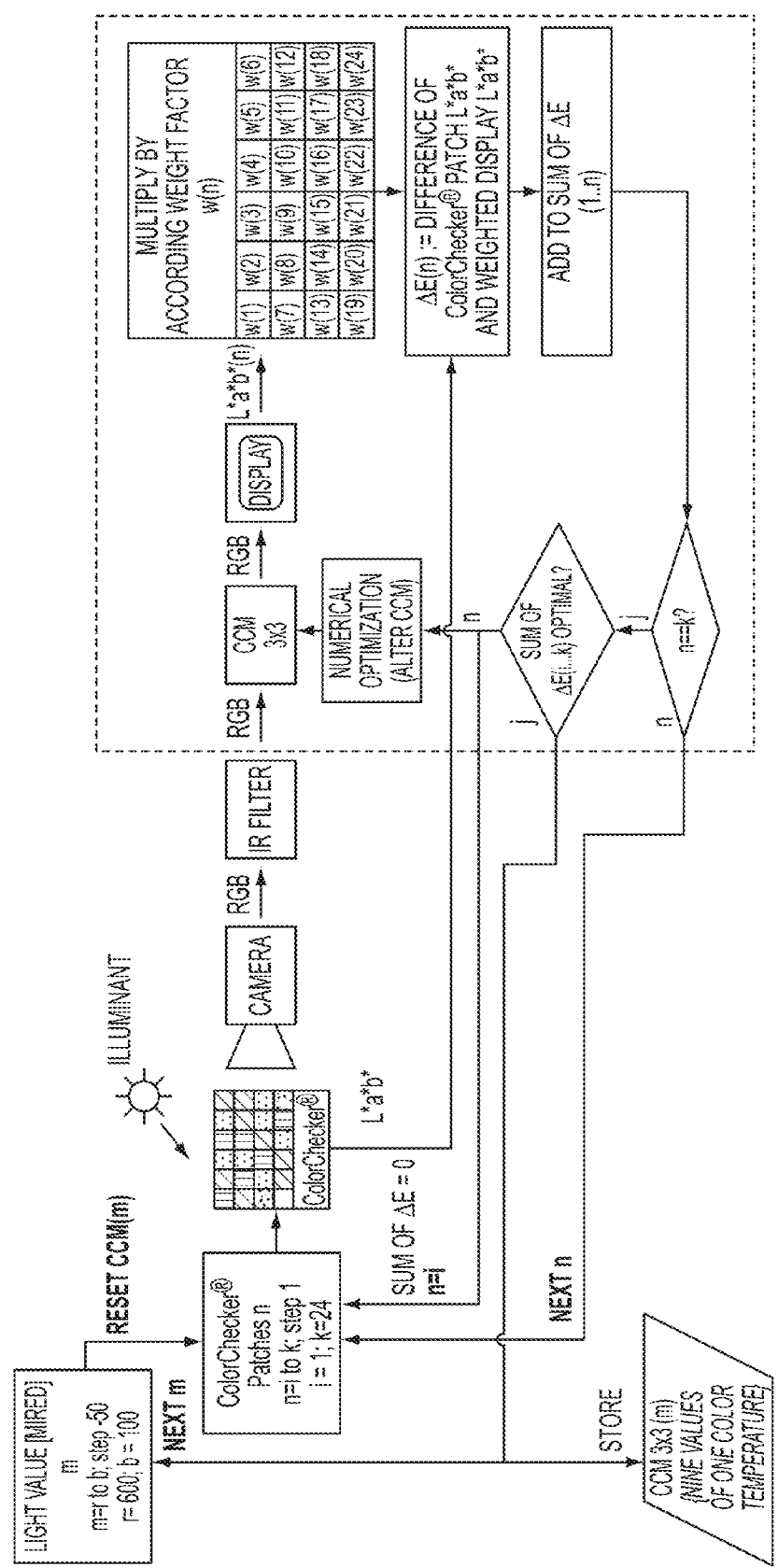
FIG. 5 shows how an algorithm may generate 3×3 CCM matrix values for each color temperature value (along the Planckian Locus) offline prior use, shown with the dotted line enclosing the numerical optimization loop.
Figure 6A:
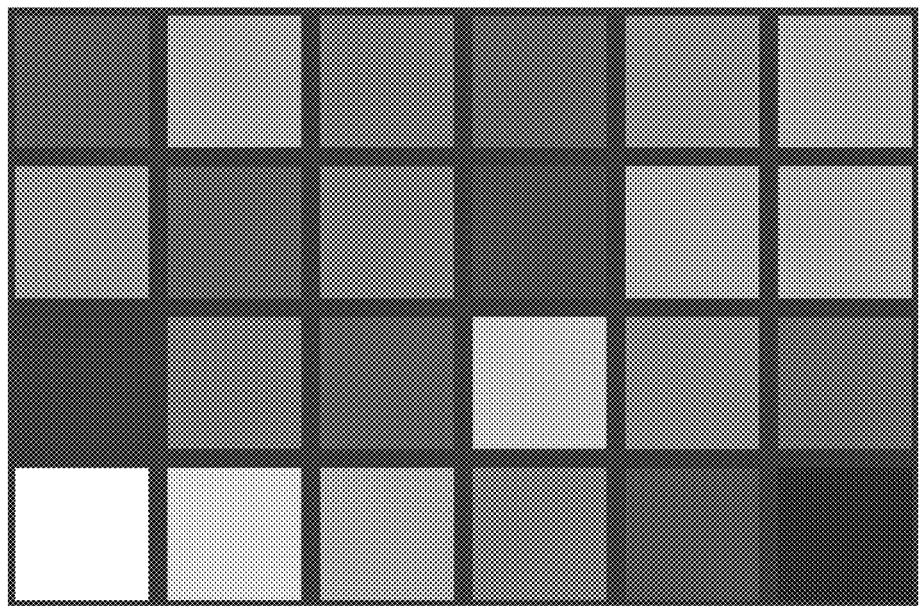
FIG. 6A shows a standard ColorChecker® patch board (in black and white)
Figure 6B:
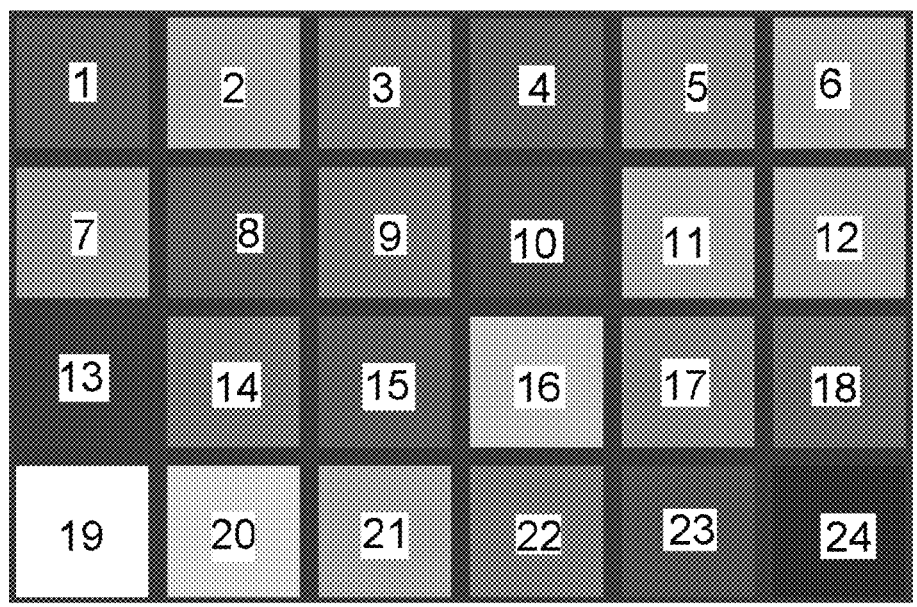
FIG. 6B shows a standard ColorChecker® patch board with numerated patches (in black and white)

Referring to FIG. 5, which shows in detail how such an algorithm may generate 3×3 matrix values for each color temperature value (along the Planckian Locus). Hereby simulated is the process to capture a standard Color Checker® patch board (see FIG. 6A) patch (one by one) captured by the to be used camera with IR-cut-Filter (having the spectral properties such as like shown in the example of FIG. 4) and illuminated by a D65 illuminator of a known MIRED, whereby the color image is color corrected by a simulated CCM and then displayed on a simulated display which has simulated (non-perfect) color reproduction properties. The display reproduces the color image in a specific L*a*b*value. Each patch of the Color Checker® board (see FIG. 6B) has a certain weight factor (w) (see FIG. 6C), which characterizes the importance of a patch's color. The weight factor may have values between 0 and 1 (see FIG. 6D). The differences in L*a*b*value of the patch in front of the camera and that of the image reproduced (by the display) and weighted becomes added in a sum of Error ($\Delta E$). When all 24 patches (n) have been simulated, the change of the sum of all $\Delta E$ is compared. There may be other exit criteria. Optionally, as soon the Error is not diminishing any more, the found 3×3 coefficients of the color correction matrix are stored for that currently simulated color temperature (m) of the illuminant, otherwise the CCM becomes altered (optimized into the direction of smaller sum of $\Delta E$) and $\Delta E$ resets. After one color temperature points matrix coefficients are found, the algorithm resumes with a following color temperature. In the example of FIG. 5 the successive color temperature (m) is 50 MIREDs lower.

The exemplary curves A to I of FIG. 7 are such nine polynomial curves representing a 3×3 Color Correction Matrix Coefficient sets along the Planckian Locus color temperatures generated by an algorithm as like described above.

Figure 8A:
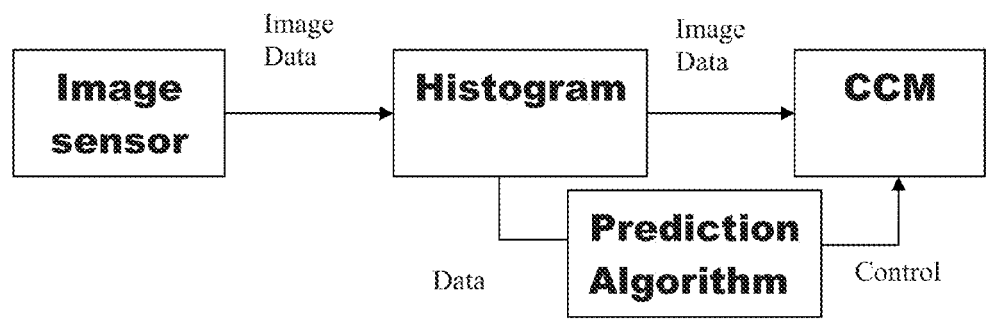
FIG. 8A is a block diagram of a color correction scheme or process that utilizes a histogram input.
Figure 8B:
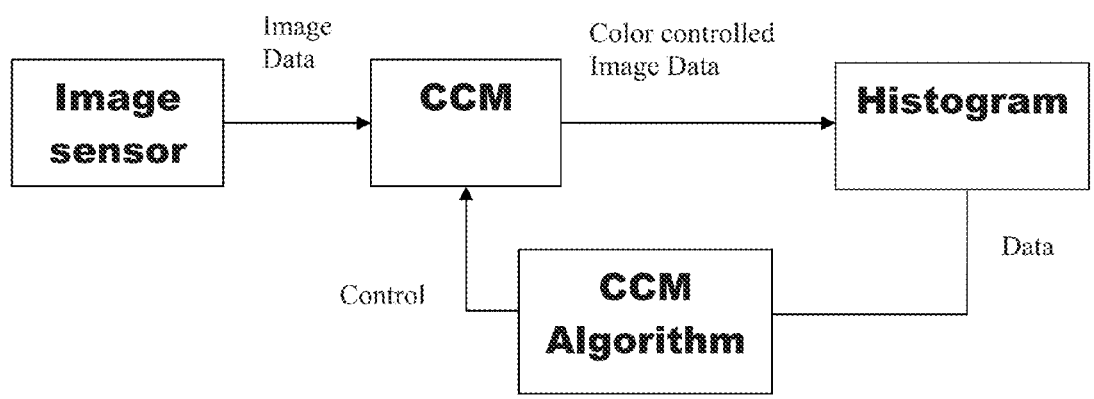
FIG. 8B is a block diagram of a color correction algorithm scheme or process having a loop feedback from the histogram to the color correction matrix (CCM) via a color correction matrix algorithm (CCM-Algorithm) in accordance with the present invention.

In some known color correction algorithms (such as represented in FIG. 8A), the algorithm adjusts the color correction matrixes (CCM) at one step depending on the histogram delivered from the image capturing device or camera during run time. During run time, the algorithm of the present invention (and such as shown in FIG. 8B) does the correction in an iterative (evolutional) loop. The histogram is used as an input to the color correction matrix algorithm (CCM algorithm) after being processed/corrected/shifted by the color correction matrix (CCM). The histogram thus changes during operation and processing, and thus changes the input parameter of the CCM over subsequent loops.

In nature there is always the statistical probability that gray points are prevalent. An accumulation of points tend to appear near to white. The method or process of the present invention identifies these probabilities. The color histogram is computed in r-g color space.

The components of the color space are defined as follows:

$$r = \frac{R}{R+G+B}$$
$$g = \frac{G}{R+G+B}$$

Where R, G and B are the output of the CCM.

Any pixels that fulfill the following conditions must not be used for color histograms:
equal R, G, B components
any R, G, B component larger than 90% full scale.

The nominal output range of the CCM is 0 to 1. In extreme cases the output of the CCM can be up 15.

Figure 2A:
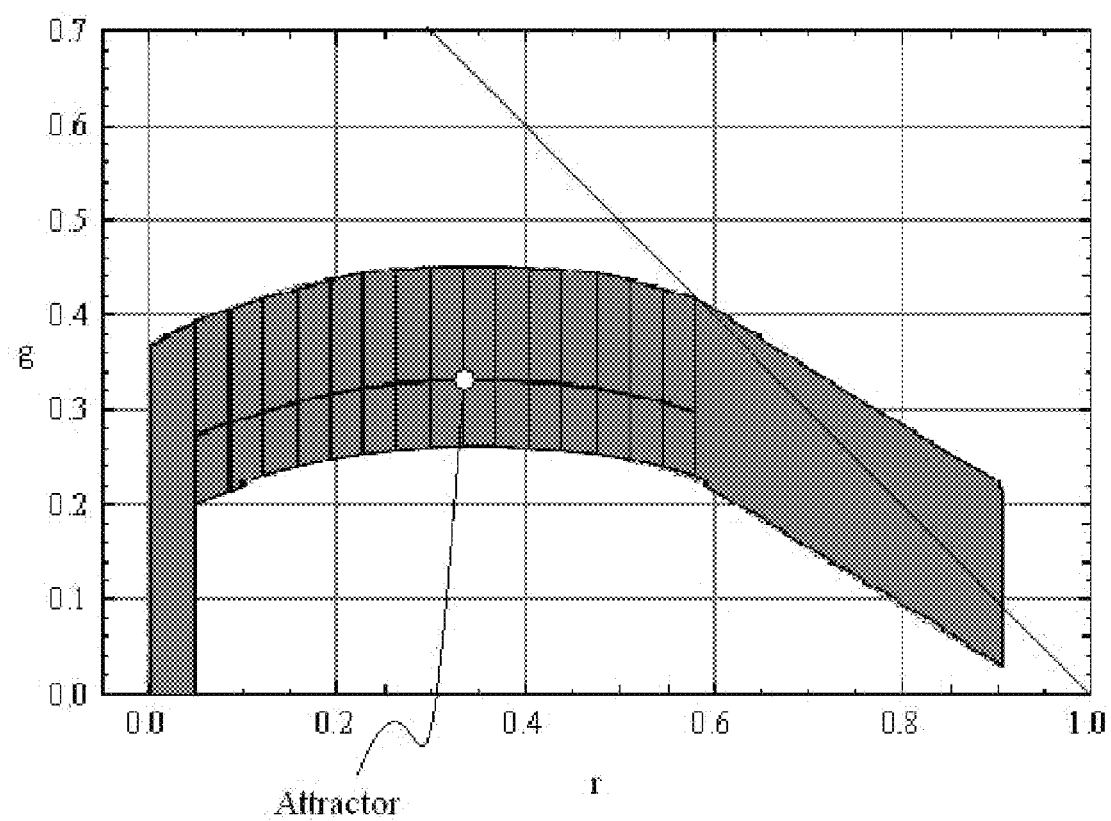
FIG. 2A is a Planckian Locus with tolerance band within a section r-g color room.
Figure 2B:
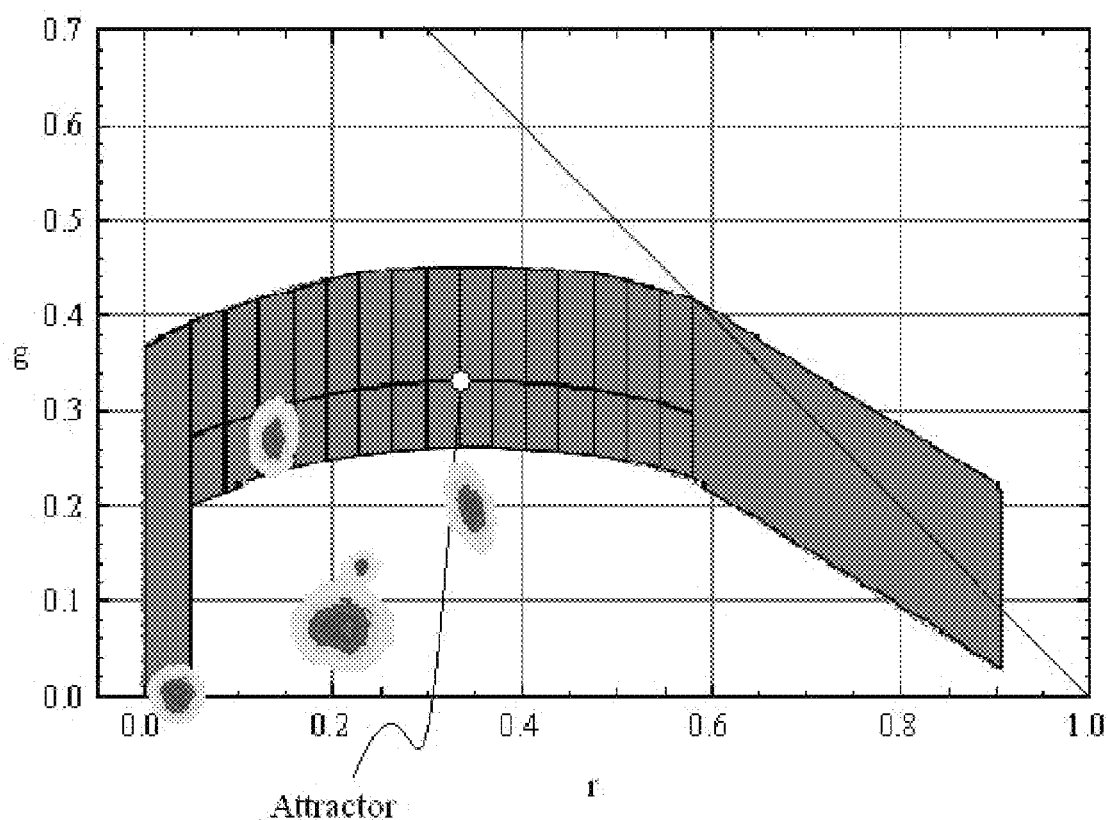
FIG. 2B is an example of a pattern of intense light spots appearing within a natural image close to the Planckian Locus with tolerance band within a section of the r-g color room, with the color correction matrix algorithm not executed at that point of time $CCM(t_0)$ (initial status of CCM)
Figure 2C:
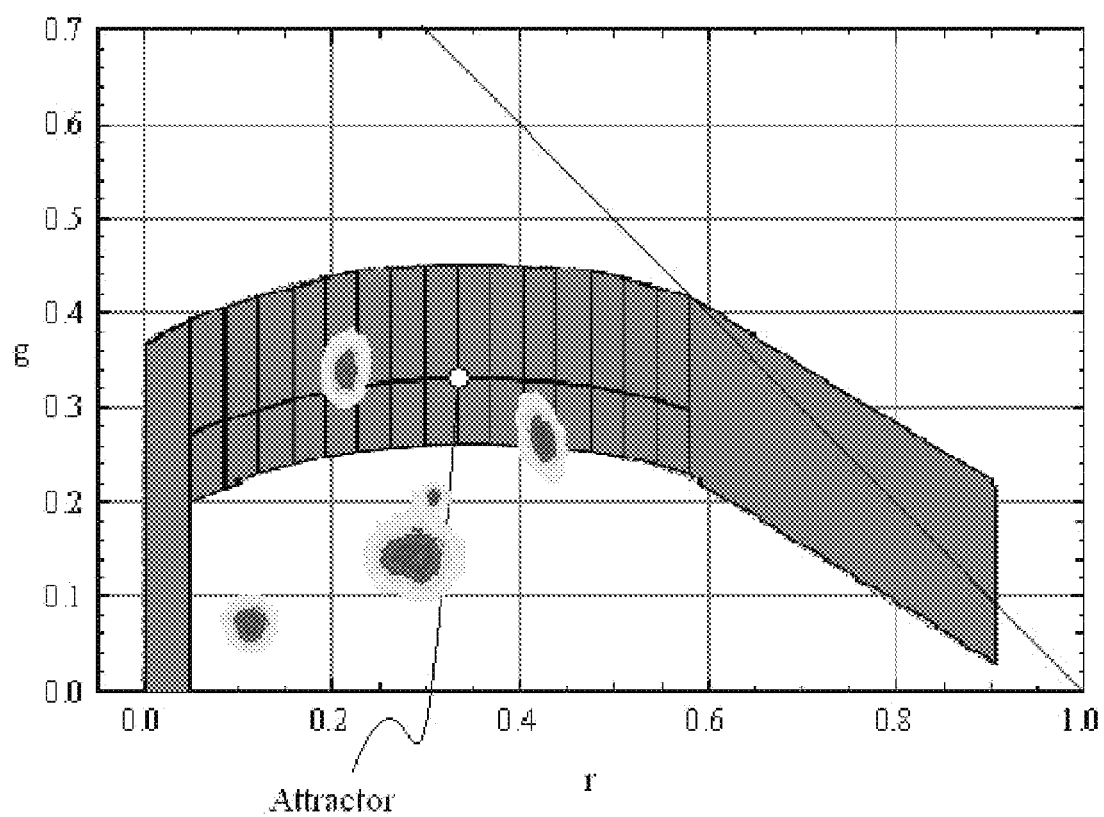
FIG. 2C is the example of FIG. 2B, showing the pattern of intense light spots shifted substantially in the g direction by a step within a section of the r-g color room, with the color correction matrix algorithm executed once: $CCM(t_{0+1})$.
Figure 2D:
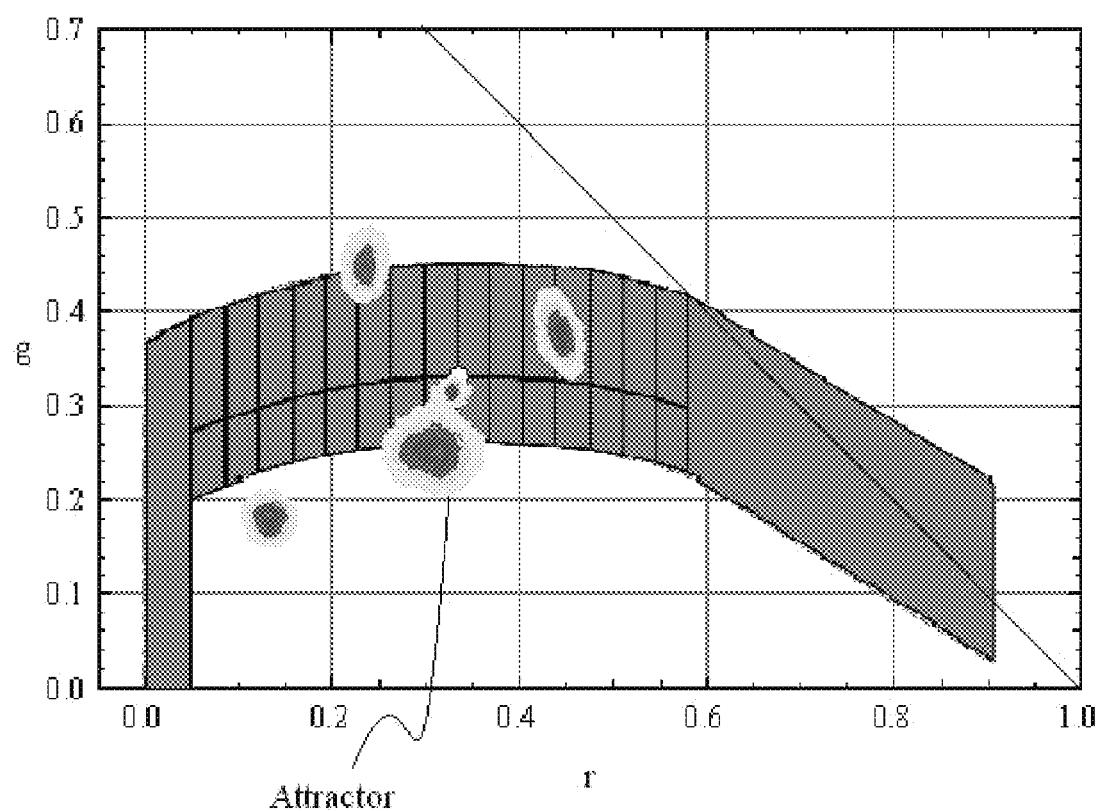
FIG. 2D is the example of FIGS. 2B and 2C, showing the pattern of intense light spots shifted another step substantially in the y direction within a section of the r-g color room, with the color correction matrix algorithm executed twice: $CCM(t_{0+2})$.

The system or method of the present invention selects or establishes sections along the Planckian Locus that are within a tolerance band above and below the locus (such as shown in FIG. 2A). Each section or bin is assigned two coefficients, one for "r" error signal generation and one for "g" error signal generation. The error signal is the sum of all bin counts multiplied with the coefficients divided by the sum of all bin counts. The coefficients must be writeable. The sections above the Locus have a negative sign and the sections below the Locus have a positive in the g value. At about the middle there is the to-be-desired D65 gray point. At the right of it the tolerance bins have a negative for sign and at the left the for sign is positive, A color r and g error signal may be generated as like this equation:

$$error = \frac{\sum_{i=1}^{32} c_i count_i}{\sum_{i=1}^{32} count_i}$$

c=error coefficient
count=color bin i count

The system or method may assume that only points which are within the tolerance band can potentially have a true color of white. For cases where the system is massively tuned into red or blue at start up time, the two wider tolerance bins do capture these points. At that bin the histograms points majority is (within the tolerance band) that r g correction the CCM receives as corrective.

Figure 2E:
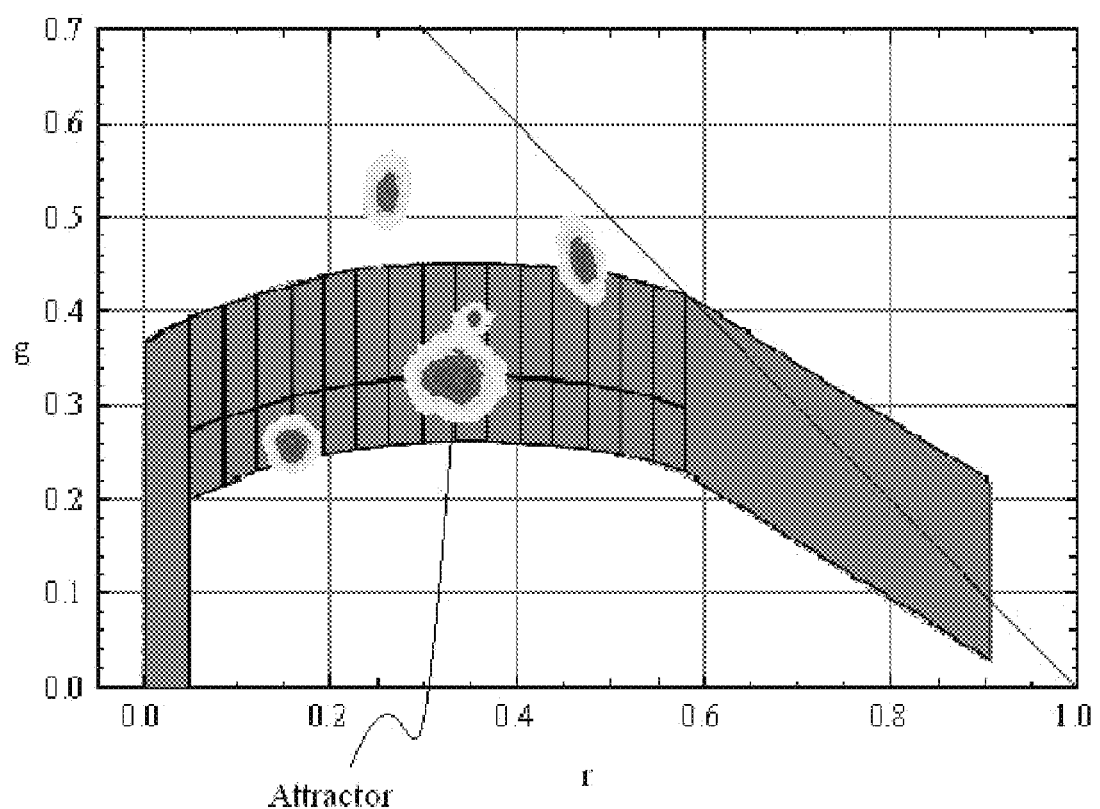
FIG. 2E is the example of FIGS. 2B, 2C and 2D, showing the pattern of intense light spots shifted finally $\{CCM(t_{0+n})\}$ into a position within a section of the r-g color room where the majority of intense (so assumingly white) light spots is on or close around to the Planckian Locus.
Figure 9:
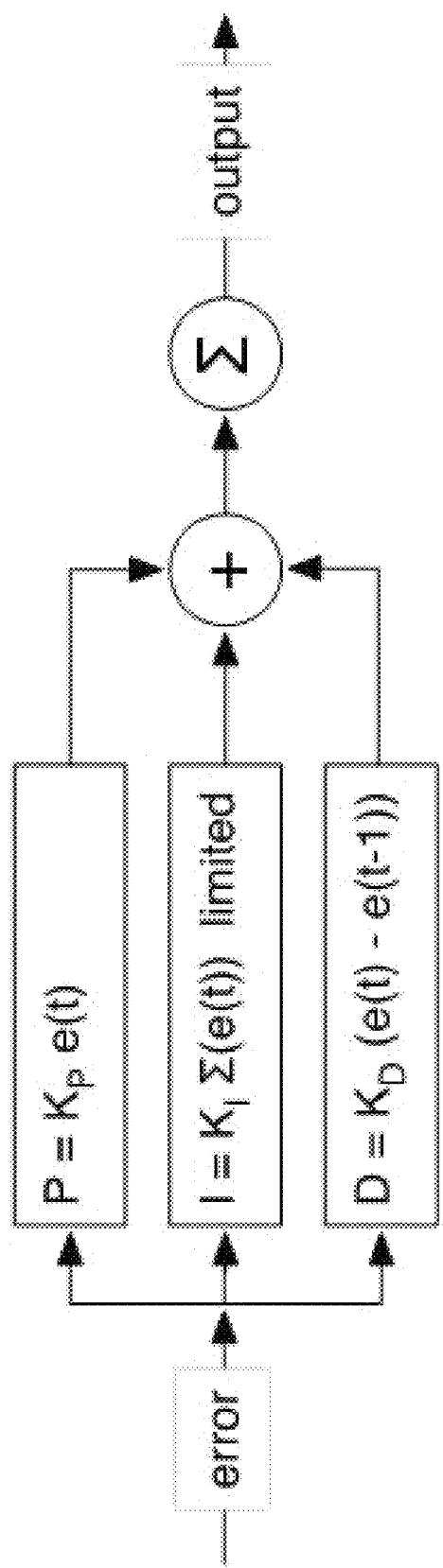
FIG. 9 shows a PID control which may be employed for generating the r value and the g value out of the color temperature for choosing the nine corrective color coefficients out of the polynomials.

The CCM-algorithm may comprise two independent channels which may both employ a PID control for visual pleasing color balancing (see FIG. 9). The PID coefficients may be chosen to cope lack time and to hinder oscillating. Its output defines a (normalized) color temperature value (between 0 and 1) which translates to a (unit-less) color temperature between 0 and 100 according to the exemplary curves in FIG. 7. The loop algorithm migrates to the center weight of white points (as like shown in an exemplary case in the FIGS. 2B, 2C, 2D and 2E). For example, a side maxima of nearly white points may be tracked, and by the migration of the correction matrix, the white main maxima comes into the range of the locus tolerance band. In later processing or subsequent loops, this white maxima becomes centered properly along the locus (as like shown in above example FIG. 2E). The correction steps may be chosen in an effective manner, essential is that the direction is the right one, this means the leading sign has to be determined correctly. The algorithm of the present invention thus adjusts the correction matrix within both the r dimension and the g dimension. When the white maxima is properly centered, all (other colored) pixels appear in their true or substantially true colors of the imaged objects in the display.

Therefore, the present invention uses color cameras (such as pixelated imaging arrays using spectral filtering that comprises one or more color filters or dyes disposed at or in front of the pixelated photosensors of the imaging array) and processes the color image data captured by the camera to correct for color error or variation in the captured colors, such as may be due to colored lighting or the like, whereby the imaged objects may be displayed in their true or substantially true colors and/or image data may be processed in its true or substantially true colors. The system or method of the present invention utilizes a hysteresis loop that receives an output from a color correction matrix algorithm and that, after processing the output, generates an output that is used as the input to the color correction matrix algorithm, such that the data is processed in a color correction loop until the colors are properly corrected and white colors are properly determined to be along the Planckian Locus. The system or method of the present invention also reduces the memory required to process the image data by pre-calculating or pre-determining typical illumination scenarios, such that, when a particular illumination scenario is determined, the system can utilize a predetermined polynomial equation to calculate data points along the x-y color curve, thus enhancing the efficiency and reducing the cost and complexity of the system.

The system may utilize an illuminator or light emitter that emits illumination in a known color or wavelength or range of wavelengths. The illuminator or light source or light emitter may comprise a Planckian emitter or illuminator. The illuminator may be part of an exterior light of the vehicle or may be a separate light source that illuminates the area within the field of view of the imager or camera.

The imaging sensor or camera that captures the image data for image processing may comprise any suitable camera or sensing device, such as, for example, an array of a plurality of photosensor elements arranged in at least about 640 columns and at least about 480 rows (at least a 640×480 imaging array), with a respective lens focusing images onto respective portions of the array. Preferably, the photosensor array comprises a mega-pixel array having at least one million pixels. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012 and published Feb. 7, 2013 as International Publication No. WO 2013/019707, and/or PCT Application No. PCT/US2012/048110, filed Jul. 25, 2012 and published Jan. 31, 2013 as International Publication No. WO 2013/016409, and/or PCT Application No. PCT/CA2012/000378, filed Apr. 25, 2012 and published Nov. 1, 2012 as International Publication No. WO 2012/145822, and/or PCT Application No. PCT/US2012/056014, filed Sep. 19, 2012 and published Mar. 28, 2013 as International Publication No. WO 2013/043661, and/or PCT Application No. PCT/US12/57007, filed Sep. 25, 2012 and published Apr. 4, 2013 as International Publication No. WO 2013/048994, and/or PCT Application No. PCT/US2012/061548, filed Oct. 24, 2012 and published on May 2, 2013 as International Publication No. WO 2013/063014, and/or PCT Application No. PCT/US2012/062906, filed Nov. 1, 2012 and published on May 10, 2013 as International Publication No. WO 2013/067083, and/or U.S. patent application Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. US-2013-002873, and/or U.S. provisional applications, Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/563,965, filed Nov. 28, 2011; Ser. No. 61/559,970, filed Nov. 15, 2011; Ser. No. 61/556,556, filed Nov. 7, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/650,667, filed May 23, 2012; Ser. No. 61/579,682, filed Dec. 23, 2011; Ser. No. 61/565,713, filed Dec. 1, 2011, which are hereby incorporated herein by reference in their entireties.

The vision system may integrate the front and rear cameras, such as by utilizing aspects of the vision systems described in U.S. provisional applications, Ser. No. 61/682,486, filed Aug. 13, 2012; and Ser. No. 61/648,744, filed May 18, 2012, which are hereby incorporated herein by reference in their entireties. The image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/

036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/US2012/048993, filed Jul. 31, 2012 and published Feb. 7, 2013 as International Publication No. WO 2013/019795, and/or PCT Application No. PCT/CA2012/000378, filed Apr. 25, 2012 and published Nov. 1, 2012 as International Publication No. WO 2012/145822, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; and/or Ser. No. 61/559,970, filed Nov. 15, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A method for processing color image data captured by a vehicular camera disposed at a vehicle to correct for color error, said method comprising:
   providing a color camera comprising an imaging array having a plurality of photosensors;
   disposing one or more spectral filters at or in front of photosensors of the plurality of photosensors of the imaging array;
   disposing the color camera at a vehicle so as to have a field of view exterior of the vehicle;
   providing an image processor;
   capturing image data with the color camera;
   providing captured image data to the image processor;
   processing image data captured by the color camera via the image processor;
   wherein said processing of image data comprises processing via an algorithmic loop that corrects color variation due to lighting conditions so that images derived from captured image data are color corrected; and
   wherein the algorithmic loop comprises processing image data in a color correction loop for color correction.

2. The method of claim 1, wherein said processing of image data utilizes pre-determining illumination scenarios.

3. The method of claim 2, wherein said processing of image data comprises pre-determining illumination scenarios, such that, when a particular illumination scenario is determined, the system can utilize a predetermined polynomial equation to calculate data points along an x-y color curve based on the determined particular illumination scenario.

4. The method of claim 1, wherein disposing the color camera comprises disposing the color camera at a rear of the vehicle so as to have a field of view rearward of the vehicle.

5. The method of claim 4, comprising providing an illumination source at the rear of the vehicle.

6. The method of claim 5, wherein said processing of image data comprises processing for color correction to account for a color of light emitted by the illumination source.

7. The method of claim 1, wherein the hysteresis loop corrects color variation due to lighting conditions so that white colors are properly determined to be along a Planckian Locus.

8. The method of claim 1, wherein said processing of image data comprises utilization of a color correction algorithm that includes a color correction matrix algorithm.

9. The method of claim 8, wherein the color correction algorithm comprises the color correction matrix algorithm and a histogram algorithm to determine a color correction for the captured image data.

10. The method of claim 8, wherein said processing of image data comprises receiving an output from a histogram algorithm and, after processing the output, generating an output that is used as an input to the color correction matrix algorithm.

11. The method of claim 10, wherein an output of the color correction matrix algorithm is used as an input to the histogram algorithm.

12. The method of claim 11, comprising repeating the color correction matrix algorithm and the histogram algorithm until a desired level of color correction is determined.

13. The method of claim 12, wherein the color correction matrix algorithm and the histogram algorithm repeatedly operate to migrate a plurality of data points representative of white points through a color room towards a center line of white points along a Planckian locus.

14. The method of claim 13, wherein the histogram algorithm does not use the data points when an RGB component of the data points exceeds a threshold fraction of full scale.

15. The method of claim 14, wherein the threshold fraction of full scale of the RGB component is ninety percent.

16. The method of claim 1, wherein the image processor includes polynomial equations representative of light plots in white illuminated illumination scenarios, and wherein the image processor, responsive to a determination that captured image data is representative of a typical illumination scenario, uses a corresponding polynomial equation to deter- 17. A method for processing color image data captured by a vehicular camera disposed at a vehicle to correct for color error, said method comprising:

providing a color camera comprising an imaging array having a plurality of photosensors;

disposing one or more spectral filters at or in front of photosensors of the plurality of photosensors of the imaging array;

disposing the color camera at a rear of a vehicle so as to have a field of view rearward of the vehicle;

providing an illumination source at the rear of the vehicle;

providing an image processor;

capturing image data with the color camera;

providing captured image data to the image processor;

processing image data captured by the color camera via the image processor;

wherein said processing of image data comprises processing that corrects color variation due to lighting conditions so that images derived from captured image data are color corrected; and wherein said processing of image data comprises processing for color correction to account for a color of light emitted by the illumination source.

18. The method of claim 17, wherein said processing of image data comprises utilization of a color correction algorithm that includes a color correction matrix algorithm, and wherein the color correction algorithm comprises the color correction matrix algorithm and a histogram algorithm to determine a color correction for the captured image data.

19. The method of claim 17, wherein the image processor, responsive to a determination that captured image data is representative of a typical illumination scenario, uses a corresponding polynomial equation to determine a desired point along a polynomial equation without having to interpolate between data points.

20. A method for processing color image data captured by a vehicular camera disposed at a vehicle to correct for color error, said method comprising:

providing a color camera comprising an imaging array having a plurality of photosensors;

disposing one or more spectral filters at or in front of photosensors of the plurality of photosensors of the imaging array;

disposing the color camera at a rear of a vehicle so as to have a field of view rearward of the vehicle;

providing an illumination source at the rear of the vehicle;

providing an image processor;

capturing image data with the color camera;

providing captured image data to the image processor;

processing image data captured by the color camera via the image processor;

wherein said processing of image data comprises processing via an algorithmic loop that corrects color variation due to lighting conditions so that images derived from captured image data are color corrected;

wherein the algorithmic loop comprises processing image data in a color correction loop for color correction;

wherein said processing of image data comprises pre-determining illumination scenarios, such that, when a particular illumination scenario is determined, the system can calculate data points along an x-y color curve based on the determined particular illumination scenario; and wherein said processing of image data comprises processing for color correction to account for a color of light emitted by the illumination source.

21. The method of claim 20, wherein, when a particular illumination scenario is determined, the system utilizes a predetermined polynomial equation to calculate data points along an x-y color curve based on the determined particular illumination scenario.

* * * * *